United States Patent
You et al.

(10) Patent No.: US 10,645,642 B2
(45) Date of Patent: May 5, 2020

(54) SYSTEM INFORMATION TRANSMISSION METHOD, BASE STATION, AND USER EQUIPMENT

(71) Applicant: Huawei Technologies Co., Ltd., Shenzhen (CN)

(72) Inventors: Chunhua You, Shanghai (CN); Qufang Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/023,800

(22) Filed: Jun. 29, 2018

(65) Prior Publication Data

US 2018/0310235 A1   Oct. 25, 2018

Related U.S. Application Data

(63) Continuation of application No. PCT/CN2015/100082, filed on Dec. 31, 2015.

(51) Int. Cl.
*H04W 72/04* (2009.01)
*H04W 48/16* (2009.01)
*H04W 8/00* (2009.01)

(52) U.S. Cl.
CPC .............. *H04W 48/16* (2013.01); *H04W 8/00* (2013.01); *H04W 72/04* (2013.01)

(58) Field of Classification Search
CPC ....... H04W 48/16; H04W 72/04; H04W 8/00; H04B 7/2615; H04J 4/00; H04L 5/26
USPC ........................................................ 370/330
See application file for complete search history.

(56) References Cited

U.S. PATENT DOCUMENTS

| 2007/0217440 | A1 | 9/2007 | Cho et al. | |
| 2011/0268087 | A1* | 11/2011 | Kwon | H04L 5/0005 370/331 |
| 2015/0055541 | A1* | 2/2015 | Zhang | H04W 72/005 370/312 |
| 2016/0174257 | A1* | 6/2016 | Webb | H04W 74/006 455/450 |
| 2016/0219475 | A1* | 7/2016 | Kim | H04L 5/00 |
| 2016/0270013 | A1* | 9/2016 | Soriaga | H04W 56/0015 |
| 2017/0141833 | A1* | 5/2017 | Kim | H04B 7/0626 |

(Continued)

FOREIGN PATENT DOCUMENTS

| CN | 101128031 A | 2/2008 |
| CN | 101217689 A | 7/2008 |

(Continued)

OTHER PUBLICATIONS

CATT, "Transfer mechanism of system information," 3GPP TSG-RAN WG2#56bis, R2-070112, Sorrento, Italy, Jan. 15-19, 2007, 5 pages.

(Continued)

*Primary Examiner* — Robert J Lopata
(74) *Attorney, Agent, or Firm* — Slater Matsil, LLP (57) ABSTRACT

Embodiments of the present invention provide an SI transmission method, a base station, and user equipment. The method includes: sending a request to a base station, where the request is used to request at least one type of SI of a first-type cell, and the first-type cell is a cell on which channel detection needs to be performed before data is sent; and receiving the at least one type of SI of the first-type cell.

15 Claims, 3 Drawing Sheets

(56) References Cited

U.S. PATENT DOCUMENTS

2018/0103380 A1* 4/2018 Ode .................. H04W 16/14
2018/0288683 A1* 10/2018 Bendlin ............... H04W 48/14

FOREIGN PATENT DOCUMENTS

CN      101873568 A    10/2010
CN      103763755 A     4/2014

OTHER PUBLICATIONS

NTT Docomo, Inc., "Text proposal for system information scheduling," 3GPP TSG RAN WGz #62, R2-082740, Kansas City, USA, May 5-9, 2008, 2 pages.

Huawei, "Optimization of System Information reading time," 3GPP TSG RAN2#54, R2-062241, Tallinn, Estonia, Aug. 28-Sep. 1, 2006, 4 pages.

Nokia, et al., "Performance Enhancement by Deferred Measurement Control Reading," 3GPP TSG RAN2 #56bis, Tdoc R2-070122, Sorrento, Italy, Jan. 15-19, 2007, 3 pages.

* cited by examiner

SYSTEM INFORMATION TRANSMISSION METHOD, BASE STATION, AND USER EQUIPMENT

CROSS-REFERENCE TO RELATED APPLICATIONS

This application is a continuation of International Application No. PCT/CN2015/100082, filed on Dec. 31, 2015, the disclosure of which is hereby incorporated by reference in its entirety.

TECHNICAL FIELD

The present invention relates to the communications field, and more specifically, to a system information transmission method, a base station, and user equipment.

BACKGROUND

To help UE access a cell and normally work in the cell, a base station periodically broadcasts system information (SI). The SI is cell-level information. To be specific, the SI is available to all UEs that access the cell. The SI includes system information blocks (SIB). Each SIB includes a parameter configuration set related to one or more functions.

There are two types of cell SI. One type cell SI is a master information block (MIB) with a periodicity of 40 ms. The master information block is repeatedly sent four times within 40 ms, a different redundancy version is used in each time of transmission, and the master information block is transmitted using a physical broadcast channel (PBCH). The PBCH is located on the first four OFDM symbols of the second timeslot in a subframe 0 in the time domain, and occupies six PRBs in the frequency domain. Each PRB occupies 12 subcarriers. REs corresponding to these PRBs can be used to transmit only the MIB, and cannot be used to transmit another message. Message content of the MIB mainly includes cell downlink bandwidth, PHICH configuration, and an SFN (8 most significant bits and 2 least significant bits are determined using four redundancy versions). Another type of cell SI is a SIB. There are a plurality types of SIBs. Currently, a SIB 1, a SIB 2, . . . , and a SIB 19 exist. Each type of SIB is corresponding to parameter configuration of one or some specific functions. All the SIBs are transmitted by using a PDSCH and scrambled by using an SI-RNTI. In other words, the UE receives all the SIBs using one SI-RNTI.

The SIB 1 has a periodicity of 80 ms. In addition, one SIB 1 is repeatedly sent in a subframe 5 of an even number system frame in the periodicity, and this needs to be indicated using a PDCCH in frequency domain. The SIB 1 includes scheduling information of other SIBs. The scheduling information directly indicates SIBs in the cell and periodicities and subframe locations of the SIBs. Each piece of system information may include one or more SIBs. These SIBs have a same transmission periodicity. Each piece of SI is transmitted only in one SI window. First, one piece of SI is associated with one SI window, and the SI window can be used only for sending the SI, and the SI can be repeatedly sent a plurality of times (a quantity of sending times, subframes in which the SI is sent, and the like depend on implementation of the base station), but the SI window cannot be used for sending other SI. Second, SI windows are next to each other, which do not overlap and between which there is no space. Third, all SI has a same SI window length. Fourth, periodicities of different SI are independent of each other.

In comparison with a licensed spectrum cell, an unlicensed cell uses an unlicensed spectrum, and the spectrum is public. The unlicensed spectrum cell may be an LAA cell. The unlicensed spectrum cell can work only when performing carrier aggregation (CA) with the licensed spectrum cell. Alternatively, the unlicensed spectrum cell may be a standalone LAA cell, and can independently work without relying on the licensed spectrum cell. Before sending SI of the unlicensed cell, the base station needs to perform a listen before talk (LBT) process. If LBT succeeds, a SIB and/or a MIB are/is successfully sent; or otherwise, a SIB and/or a MIB cannot be sent. The LBT process means that both the UE and the base station need to perform channel energy detection such as CCA (Clear Channel Assessment) detection before sending data. If energy obtained through detection is less than or equal to a threshold, it is considered that a channel is idle, and data can be sent.

Both the MIB and the SIB are periodically broadcast. If a serving cell has a small quantity of users, when the system information is repeatedly broadcast, a relatively large quantity of radio resources are occupied, and interference is further caused to a serving cell on which channel detection needs to be performed or another unlicensed cell.

SUMMARY

Embodiments of the present invention provide a system information transmission method, a base station, and user equipment, so that unnecessary SI overheads can be reduced, and interference to another cell can be reduced.

According to a first aspect, a system information transmission method is provided. The method includes: sending a request to a base station, where the request is used to request at least one type of SI of a first-type cell, and the first-type cell is a cell on which channel detection needs to be performed before data is sent. The method also includes receiving the at least one type of SI of the first-type cell.

With reference to the first aspect, in a first possible implementation, the receiving the at least one type of SI of the first-type cell is specifically: receiving the at least one type of SI of the first-type cell in one or more SI windows following a current SI window that is corresponding to the first-type cell at a current moment at which the request is sent to the base station.

With reference to the first possible implementation of the first aspect, in a second possible implementation, specific implementation is as follows: The SI window for receiving the at least one type of SI of the first-type cell is an $N^{th}$ SI window following the current SI window, and N is an integer greater than or equal to 1.

With reference to the first or the second possible implementation of the first aspect, in a third possible implementation, specific implementation is as follows: An SI window time length of the first-type cell is less than or equal to an SI window period of the first-type cell.

With reference to any one of the first aspect, or the first to the third possible implementations of the first aspect, in a fourth possible implementation, the sending a request to a base station is specifically: sending the request on a request resource pre-allocated in the first-type cell, where when time-frequency resource location information of the pre-allocated request resource is agreed on in advance in a communication protocol or is obtained using a broadcast message, all user equipments in the first-type cell can request SI using the pre-allocated request resource; or when time-frequency resource location information of the pre-allocated request resource is obtained through unicast or using dedicated signaling, user equipment that obtains the time-frequency resource location information of the pre-allocated request resource can request SI using the pre-allocated request resource.

With reference to the fourth possible implementation of the first aspect, in a fifth possible implementation, specific implementation is as follows: A time domain location of a time-frequency resource on which the request resource is located is agreed on in advance in a communication protocol. A time domain location of a time-frequency resource on which the request resource is located is obtained by receiving a MIB message; or a time domain location of a time-frequency resource on which the request resource is located is obtained by receiving a SIB1-x message, where the SIB1-x message is a periodically broadcast message in a SIB1 message of the first-type cell.

With reference to the fourth or the fifth possible implementation of the first aspect, in a sixth possible implementation, specific implementation is as follows: A frequency domain location of the time-frequency resource on which the request resource is located is agreed on in advance in a communication protocol; a frequency domain location of the time-frequency resource on which the request resource is located is obtained by receiving a MIB message; a frequency domain location of the time-frequency resource on which the request resource is located is obtained by receiving a SIB1-x message, where the SIB1-x message is a periodically broadcast message in a SIB1 message of the first-type cell; or a frequency domain location of the time-frequency resource on which the request resource is located is obtained by detecting a physical downlink control channel PDCCH resource.

With reference to any one of the fourth to the sixth possible implementations of the first aspect, in a seventh possible implementation, specific implementation is as follows: A configuration parameter for sending the request is agreed on in advance in a communication protocol; a configuration parameter for sending the request is obtained by receiving a MIB message; or a configuration parameter for sending the request is obtained by receiving a SIB1-x message, where the SIB1-x message is a periodically broadcast message in a SIB1 message of the first-type cell.

With reference to any one of the fourth to the seventh possible implementations of the first aspect, in an eighth possible implementation, specific implementation is as follows: The request resource is a physical random access channel (PRACH) or a physical uplink control channel (PUCCH).

With reference to any one of the first aspect, or the first to the eighth possible implementations of the first aspect, in a ninth possible implementation, before the sending, in a first-type cell, a request to a base station, the method further includes: receiving, in the first-type cell, indication information sent by the base station, where the indication information is used to indicate that the base station has obtained a frequency resource of the first-type cell.

According to a second aspect, a system information transmission method is provided. The method includes: receiving a request sent by user equipment, where the request is used to request at least one type of SI of a first-type cell, and the first-type cell is a serving cell on which channel detection needs to be performed before data is sent. The method also includes sending the at least one type of SI of the first-type cell to the user equipment based on the request.

With reference to the second aspect, in a first possible implementation, the sending the at least one type of SI of the first-type cell to the user equipment based on the request is specifically: sending, based on the request, the at least one type of SI of the first-type cell to the user equipment in one or more SI windows following a current SI window that correspond to the first-type cell at a current moment at which the user equipment sends the request.

With reference to the first possible implementation of the second aspect, in a second possible implementation, specific implementation is as follows: The SI window for sending the at least one type of SI of the first-type cell is an $N^{th}$ SI window following the current SI window, and N is an integer greater than or equal to 1.

With reference to the first or the second possible implementation of the second aspect, in a third possible implementation, specific implementation is as follows: The at least one type of SI of the first-type cell is repeatedly sent.

With reference to any one of the first to the third possible implementations of the second aspect, in a fourth possible implementation, specific implementation is as follows: An SI window time length of the first-type cell is less than or equal to an SI window period of the first-type cell.

With reference to any one of the second aspect, or the first to the fourth possible implementations of the second aspect, in a fifth possible implementation, the receiving a request sent by user equipment is specifically: receiving the request on a request resource pre-allocated in the first-type cell, where when time-frequency resource location information of the pre-allocated request resource is agreed on in advance in a communication protocol or is sent by using a broadcast message, all user equipments in the first-type cell can request SI using the pre-allocated request resource; or when time-frequency resource location information of the pre-allocated request resource is sent through unicast or by using dedicated signaling, user equipment that obtains the time-frequency resource location information of the pre-allocated request resource can request SI using the pre-allocated request resource.

With reference to the fifth possible implementation of the second aspect, in a sixth possible implementation, the pre-allocated request resource includes at least one request resource, and the SI requested by the request includes at least one type of system information block SIB of the first-type cell. The receiving the request on a request resource pre-allocated in the first-type cell is specifically: receiving the request on the at least one request resource. The sending, to the user equipment based on the request, the SI requested by the request includes: sending, in the first-type cell, the at least one type of SI of the first-type cell to the user equipment based on the request received on the at least one request resource.

With reference to the fifth or the sixth possible implementation of the second aspect, in a seventh possible implementation, specific implementation is as follows: A time domain location of a time-frequency resource on which the request resource is located is agreed on in advance in a communication protocol; a time domain location of a time-frequency resource on which the request resource is located is sent to the user equipment by using a MIB message; or a time domain location of a time-frequency resource on which the request resource is located is sent to the user equipment by using a SIB1-x message, where the SIB1-x message is periodically broadcast information in a SIB1 message of the first-type cell.

With reference to any one of the fifth to the seventh possible implementations of the second aspect, in an eighth possible implementation, specific implementation is as follows: A frequency domain location of the time-frequency resource on which the request resource is located is agreed on in advance in a communication protocol; a frequency domain location of the time-frequency resource on which the request resource is located is sent to the user equipment by using a MIB message; a frequency domain location of the time-frequency resource on which the request resource is located is sent to the user equipment using a SIB1-x message, where the SIB1-x message is periodically broadcast information in a SIB1 message of the first-type cell; or a frequency domain location of the time-frequency resource on which the request resource is located is obtained by the user equipment by detecting a physical downlink control channel PDCCH resource.

With reference to any one of the fifth to the eighth possible implementations of the second aspect, in a ninth possible implementation, specific implementation is as follows: A configuration parameter for sending the request by the user equipment is agreed on in advance in a communication protocol; a configuration parameter for sending the request by the user equipment is sent to the user equipment using a MIB message; or a configuration parameter for sending the request by the user equipment is sent to the user equipment using a SIB1-x message, where the SIB1-x message is periodically broadcast information in a SIB1 message of the first-type cell.

With reference to any one of the fifth to the ninth possible implementations of the second aspect, in a tenth possible implementation, specific implementation is as follows: The request resource is a physical random access channel (PRACH) or a physical uplink control channel (PUCCH).

With reference to any one of the second aspect, or the first to the tenth possible implementations of the second aspect, in an eleventh possible implementation, specific implementation is as follows: Before the receiving the request sent by the user equipment, the method further includes: sending, in the first-type cell, indication information to the user equipment, where the indication information is used to notify the user equipment that the base station has obtained a frequency resource of the first-type cell.

According to a third aspect, user equipment is provided, configured to execute the method according to any one of the first aspect, or the possible implementations of the first aspect.

Specifically, the user equipment may include units configured to execute the method in any one of the first aspect, or the possible implementations of the first aspect.

According to a fourth aspect, a base station is provided, configured to execute the method according to any one of the second aspect, or the possible implementations of the second aspect.

Specifically, the base station may include units configured to execute the method in any one of the fifth aspect, or the possible implementations of the fifth aspect.

According to a fifth aspect, user equipment is provided. The user equipment includes a memory and a processor. The memory is configured to store an instruction, and the processor is configured to execute the instruction stored in the memory, and the execution of the instruction stored in the memory enables the processor to execute the method according to any one of the first aspect, or the possible implementations of the first aspect.

According to a sixth aspect, a base station is provided. The base station includes a memory and a processor. The memory is configured to store an instruction, and the processor is configured to execute the instruction stored in the memory, and the execution of the instruction stored in the memory enables the processor to execute the method according to any one of the second aspect, or the possible implementations of the second aspect.

According to a seventh aspect, a computer readable storage medium is provided, where the computer readable storage medium stores one or more programs, and the one or more programs include an instruction. When the instruction is executed by a portable electronic device that includes a plurality of application programs, the portable electronic device can execute the method according to any one of the first aspect, or the possible implementations of the first aspect.

According to an eighth aspect, a computer readable storage medium is provided, where the computer readable storage medium stores one or more programs, and the one or more programs include an instruction. When the instruction is executed by a portable electronic device that includes a plurality of application programs, the portable electronic device can execute the method according to any one of the second aspect, or the possible implementations of the second aspect.

According to the system information transmission method, the base station, and the user equipment in the embodiments of the present invention, the base station sends the system message based on the request of the user equipment, so that unnecessary SI overheads can be reduced, and interference to another cell can be reduced.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show only some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding the embodiments of the present invention, some elements used in descriptions of the embodiments of the present invention are first described herein:

A licensed spectrum and an unlicensed spectrum. Spectrums used in a wireless communications system are classified into a licensed spectrum and an unlicensed spectrum. For the licensed spectrum, usually, after a license is obtained, a corresponding licensed carrier may be used to perform a related communication service, and no resource contention exists. For example, in a Long Term Evolution (LTE) system, once initial sending time of a data frame is determined at a transmit end, all subsequent data frames are successively sent in sequence. Accordingly, once the initial sending time of the data frame is obtained at a receive end using a synchronization signal, receiving time of each subsequent data frame is determined, and the receive end does not need to adjust the receiving time of each frame. For the unlicensed spectrum, anyone can legally use a corresponding unlicensed carrier to perform a communication service. However, when data is transmitted using an unlicensed carrier, a manner of contending for a time resource is used, and data transmission does not start until a time resource is obtained through contention. In addition, after a time period of transmission, sending needs to be stopped to release a channel, so that another device has an opportunity to occupy the channel.

Listen before talk (LBT) means that a station (such as a base station) that needs to transmit data first listens on a to-be-used frequency resource, to determine whether another station transmits data. If the to-be-used frequency resource is idle, the station may transmit data. Otherwise, the station may avoid using the resource for a time period and then attempt to perform LBT. An LBT principle is usually used in a transmission mechanism that is based on an unlicensed spectrum.

A clear channel assessment (CCA) is applied to a wireless network device such as a base station, to identify whether another station transmits data. Specifically, whether a frequency resource is occupied may be determined through channel energy detection.

The technical solutions in the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, and a Long Term Evolution (LTE) system.

User equipment (UE), also referred to as a mobile terminal, mobile user equipment, and the like, may communicate with one or more core networks by using a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus that exchanges voice and/or data with the radio access network.

A base station may be a base transceiver station (BTS) in GSM or CDMA, or may be a NodeB in WCDMA, or may be an evolved NodeB ("eNB" or "eNodeB") in LTE, or may be a base station in a 5G communications system. This is not limited in the present invention. However, for ease of description, the following embodiments are described by using the eNB as an example.

Figure 1:
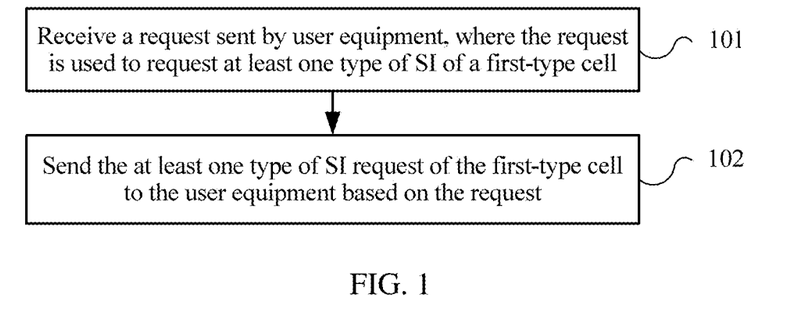
FIG. 1 is a flowchart of a system information transmission method according to an embodiment of the present invention.

FIG. 1 is a flowchart of a system information transmission method according to an embodiment of the present invention. The method in FIG. 1 is applied to a first-type cell and is executed by a base station.

101. Receive a request sent by user equipment, where the request is used to request at least one type of SI of a first-type cell.

The first-type cell is a serving cell on which channel detection needs to be performed before data is sent.

It should be understood that, as the serving cell of the user equipment, the first-type cell may be an unlicensed spectrum cell or a licensed spectrum cell on which LBT detection needs to be performed. The LBT detection is, for example, clear channel assessment (CCA) detection.

It should be understood that, for a cell on which channel detection does not need to be performed before data is sent, the base station may periodically send SI based on a prior-art method, and the user equipment does not need to request the SI.

It should be understood that, in this embodiment of the present invention, the user equipment may send a request to the base station based on SI required by the first-type cell.

102. Send the at least one type of SI of the first-type cell to the user equipment based on the request.

In this embodiment of the present invention, the base station sends the system message based on the request of the user equipment, so that unnecessary SI overheads can be reduced, and interference to another cell can be reduced.

In addition, in the method in this embodiment of the present invention, when it cannot be ensured that cell system information is periodically broadcast, the SI can be sent to the cell of the user equipment in a timely manner based on the request of the user equipment.

Optionally, in an embodiment, step 102 is specifically: sending, based on the request, the at least one type of SI of the first-type cell to the user equipment in one or more SI windows following a current SI window that is corresponding to the first-type cell at a current moment at which the user equipment sends the request. Further, the SI window for sending the at least one type of SI of the first-type cell is an $N^{th}$ SI window following the current SI window, and N is an integer greater than or equal to 1. The base station sends, in one SI window period, SI requested by a request received in the current SI window, so that SI sending efficiency can be improved.

Further, the at least one type of SI of the first-type cell is repeatedly sent. The base station repeatedly sends SI, so that a case in which a receive end misses receiving the SI due to one-time sending of the SI can be avoided, and decoding failure caused by one-time receiving can also be avoided.

Further, an SI window time length of the first-type cell is less than or equal to an SI window period of the first-type cell. It should be understood that because one cell has only one SI window at one moment, an SI window time length of the cell can be only less than or equal to an SI window period. Particularly, when the SI window time length of the cell is equal to the SI window period, SI windows of the cell are next to each other, so that an SI window utilization rate can be improved.

Optionally, the SI requested by the request is sent through broadcast, or the SI requested by the request is sent through unicast. The SI requested by the request may be sent to all UEs in the first-type cell through broadcast, and the SI requested by the request may be sent to unicast UE through unicast.

Optionally, step 101 is specifically: receiving the request on a request resource pre-allocated in the first-type cell. When time-frequency resource location information of the pre-allocated request resource is agreed on in advance in a communication protocol or is sent by using a broadcast message, all user equipments in the first-type cell can request SI using the pre-allocated request resource. When time-frequency resource location information of the pre-allocated request resource is sent through unicast or by using dedicated signaling, user equipment that obtains the time-frequency resource location information of the pre-allocated request resource can request SI by using the pre-allocated request resource.

Specifically, the pre-allocated request resource includes at least one request resource, and the SI requested by the request includes at least one type of system information block (SIB) of the first-type cell. The receiving the request on a request resource pre-allocated in the first-type cell in step 101 includes: receiving the request on the at least one request resource. Step 102 is specifically: sending, in the first-type cell, the at least one type of SI of the first-type cell to the user equipment based on the request received on the at least one request resource.

Optionally, the request resource is a physical random access channel (PRACH) resource or a physical uplink control channel (PUCCH) resource.

Optionally, in an embodiment, a time domain location of a time-frequency resource on which the request resource is located is agreed on in advance in a communication protocol.

Optionally, in another embodiment, a time domain location of a time-frequency resource on which the request resource is located is sent to the user equipment using a master information block (MIB) message.

Optionally, in still another embodiment, a time domain location of a time-frequency resource on which the request resource is located is sent to the user equipment using a SIB1-x message, where the SIB1-x message is periodically broadcast information in a SIB1 message of the first-type cell.

Optionally, in an embodiment, a frequency domain location of the time-frequency resource on which the request resource is located is agreed on in advance in a communication protocol.

Optionally, in another embodiment, a frequency domain location of the time-frequency resource on which the request resource is located is sent to the user equipment using a MIB message.

Optionally, in still another embodiment, a frequency domain location of the time-frequency resource on which the request resource is located is sent to the user equipment by using a SIB1-x message, where the SIB1-x message is periodically broadcast information in a SIB1 message of the first-type cell.

Optionally, in yet another embodiment, a frequency domain location of the time-frequency resource on which the request resource is located is obtained by the user equipment by detecting a physical downlink control channel (PDCCH) resource. For example, frequency domain location information of the time-frequency resource on which the request resource is located may be obtained by detecting downlink control information (DCI) on the PDCCH resource.

It should be understood that, before sending the request, the user equipment needs to learn of a configuration parameter for sending the request. The configuration parameter for sending the request includes a parameter required for generating the request, such as a root and a cyclic shift interval.

Optionally, in an embodiment, the configuration parameter for sending the request by the user equipment is agreed on in advance in a communication protocol, or is generated based on a parameter such as a cell identity.

Optionally, in another embodiment, the configuration parameter for sending the request by the user equipment is sent to the user equipment using a MIB message.

Optionally, in still another embodiment, the configuration parameter for sending the request by the user equipment is sent to the user equipment using a SIB1-x message, where the SIB1-x message is periodically broadcast information in a SIB1 message of the first-type cell.

Optionally, before step 101, the method further includes: sending, in the first-type cell, indication information to the user equipment, where the indication information is used to notify the user equipment that the base station of the first-type cell has obtained a frequency resource of the first-type cell. For example, when the first-type cell is an unlicensed spectrum cell, if the base station successfully preempts a cell frequency resource, the base station may quickly send some signals densely, such as a PSS/SSS and a CRS, to notify the UE that the base station has preempted the cell frequency resource.

The following further describes the method in the embodiments of the present invention with reference to specific embodiments.

Figure 2:
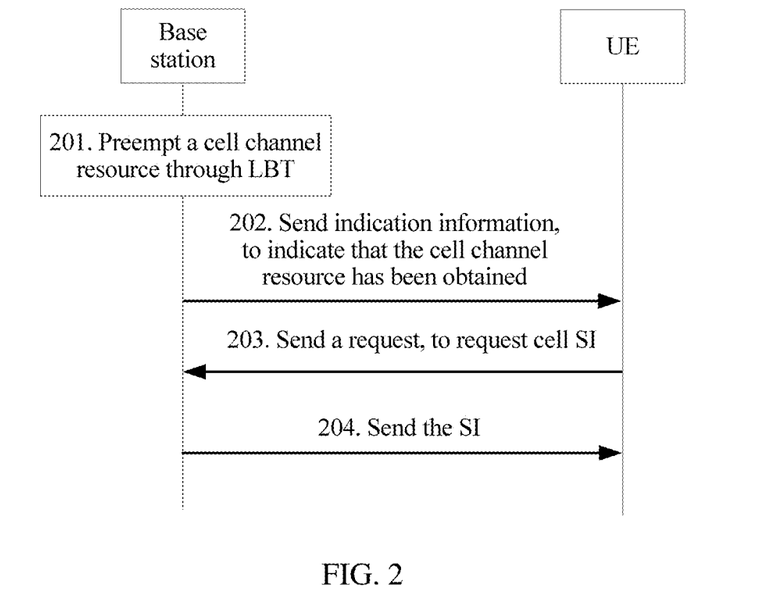
FIG. 2 is an interaction flowchart of SI transmission according to an embodiment of the present invention.

FIG. 2 is an interaction flowchart of SI transmission according to an embodiment of the present invention.

201. A base station preempts a cell frequency resource through LBT.

In this embodiment of the present invention, a first-type cell is a serving cell of user equipment, and is a serving cell on which channel detection needs to be performed before data is sent. The first-type cell may be an unlicensed spectrum cell on which LBT detection (for example, CCA detection) needs to be performed, or a licensed spectrum cell on which CCA detection needs to be performed before data is sent. It should be understood that channel detection may be implemented in a plurality of manners. For ease of understanding, LBT is used as an example for description in this embodiment of the present invention.

In some cells, cell resources are not merely used by a current base station, and may be used by another base station or device. Therefore, before communicating with the UE, the base station needs to detect, through LBT, whether an idle cell frequency resource exists.

If a cell frequency resource is used, the base station avoids using the resource for a time period and then performs LBT detection; or if a cell frequency resource is idle, the base station occupies the cell frequency resource.

202. The base station sends indication information to UE, to indicate that the base station has obtained the cell frequency resource.

After obtaining the cell frequency resource, the base station may send the indication information to the UE. The indication information is used to indicate that the base station has obtained the cell frequency resource.

Specifically, the base station may quickly send some signals densely, such as a PSS/SSS and a CRS, or send PDCCH DCI, to notify the UE that the base station side has preempted the cell frequency resource.

Certainly, it should be understood that step 202 is optional, and the UE side may periodically perform blind detection on the cell frequency resource, to determine whether the base station side preempts the cell frequency resource.

203. The base station sends an SI window parameter.

After obtaining the cell frequency resource, the base station may send the SI window parameter to the UE. Specifically, the SI window parameter may include an SI window time length and an SI window period.

Optionally, the SI window time length may be specified in a communication protocol, or may be sent using a MIB or a SIB1-x.

Optionally, the SI window period may be specified in a communication protocol, or may be sent using a MIB or a SIB1-x.

It should be understood that a manner in which the base station and the user equipment agree on the SI window time length may be the same as or different from that in which the base station and the user equipment agree on the SI window period. For example, both the SI window time length and the SI window period may be specified in a communication protocol, or the SI window time length is sent using a MIB and the SI window period is sent by using a SIB1-x.

It should be understood that the SI window time length is not greater than the SI window period.

Optionally, the base station may configure that the SI window time length is equal to the SI window period, so that SI window resources can be fully used.

204. The base station configures a request resource.

In this embodiment of the present invention, after obtaining the cell frequency resource, the base station may configure a PRACH resource as a request resource for sending an SI request by the UE.

For example, the base station may configure, for the UE in one or some uplink subframes on the cell frequency resource, a PRACH resource that occupies six RBs, and the PRACH resource is used as the resource for sending an SI request by the UE. In this embodiment of the present invention, the UE may send an SI preamble sequence on the PRACH resource, and request SI from the base station by using the SI preamble sequence.

LTE is used as an example, and a location of the PRACH resource varies with a standard of LTE.

Figure 3:
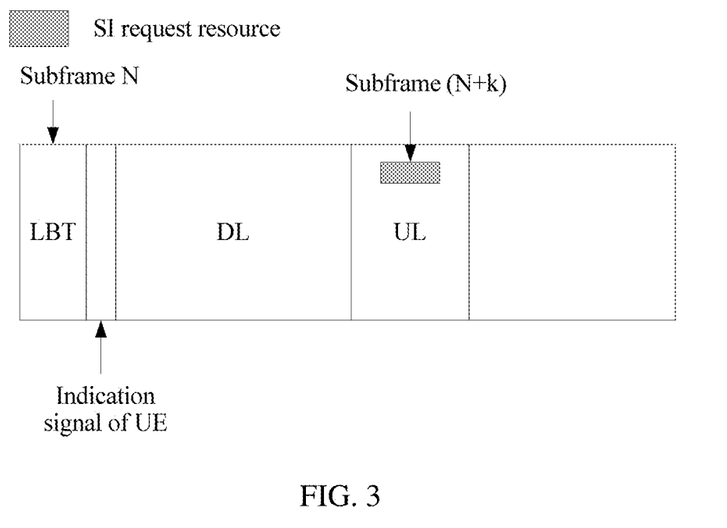
FIG. 3 is a schematic diagram of an SI request resource in a TDD system according to an embodiment of the present invention.

FIG. 3 is a schematic diagram of an SI request resource in a TDD system according to an embodiment of the present invention. As shown in FIG. 3, in the TDD system, for an uplink channel resource and a downlink channel resource of the base station, a same frequency resource is used in frequency domain but different subframes or symbols are used in time domain. The base station performs LBT detection in a subframe N. After obtaining the cell frequency resource, the base station may configure a PRACH resource for the UE in a subframe (N+K) (the subframe (N+K) is an uplink subframe), and the PRACH resource is used for sending an SI request by the UE in the cell.

Figure 4:
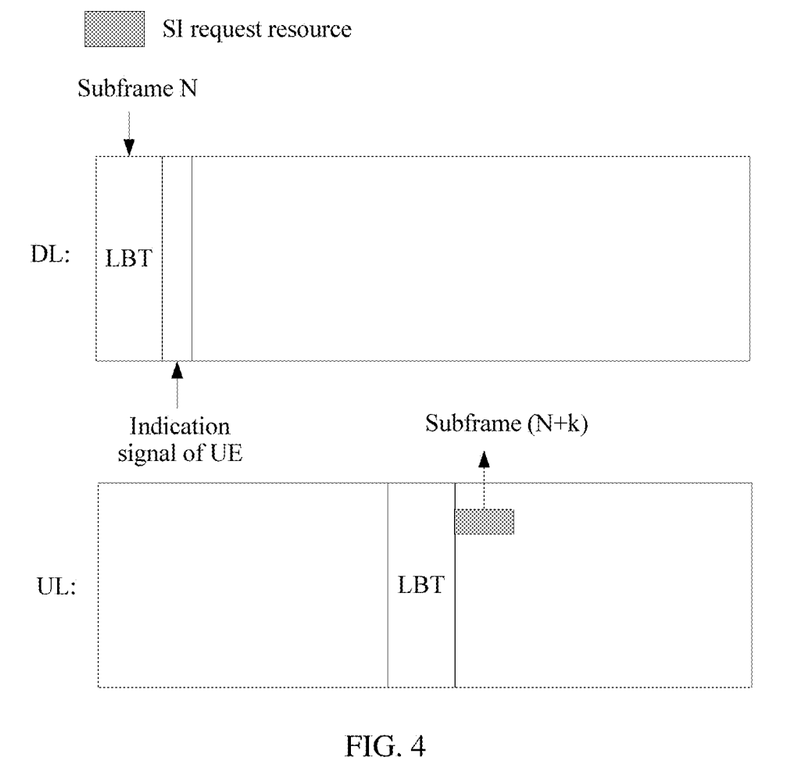
FIG. 4 is a schematic diagram of an SI request resource in an FDD system according to an embodiment of the present invention.

FIG. 4 is a schematic diagram of an SI request resource in an FDD system according to an embodiment of the present invention. As shown in FIG. 4, in the FDD system, different frequency resources are used in frequency domain for an uplink channel resource and a downlink channel resource of the base station. The base station performs, in a subframe N, LBT detection on the downlink channel resource, to obtain the cell frequency resource (including a downlink resource and an uplink resource). After obtaining the cell frequency resource, the base station may configure, in a subframe (N+K), a PRACH resource for the UE from the downlink channel resource, and configure all or some of the PRACH resource as the SI request resource, and the SI request resource is used for sending an SI request by the UE in the cell. Certainly, it should be understood that, before sending the SI request, the UE side also needs to perform LBT detection.

Optionally, a frequency domain location of the request resource configured by the base station may be specified in a communication protocol, or may be notified by the base station to the UE using a MIB, or may be notified by the base station to the UE using a SIB1-x, or may be sent by the base station to the UE by using PDCCH DCI, or the like.

Optionally, a frequency domain location of a time-frequency resource on which the request resource is located is obtained by the user equipment by detecting a PDCCH resource.

Optionally, a time domain location of the request resource configured by the base station may be specified in a communication protocol, or may be notified by the base station to the UE using a MIB, or may be notified by the base station to the UE by using a SIB1-x. The base station may set a value of k in the embodiments shown in FIG. 3 and FIG. 4, to configure the time domain location of the request resource, where k represents a subframe difference between a subframe corresponding to the request resource used for sending an SI request by the UE and a subframe corresponding to the cell frequency resource obtained by the base station. Certainly, there may be another manner of configuring the time domain location of the request resource.

It should be understood that the PRACH resource may be periodical or aperiodical. For a periodical PRACH resource, the base station needs to periodically broadcast a MIB. The base station may configure a PRACH resource after preempting a cell frequency resource each time, or configure a PRACH resource at an interval of n MIB periodicities. Optionally, a value of n may be specified in a protocol, or may be notified to the UE by using a MIB or a SIB1-x. In addition, a period may be configured for the eNB. The eNB attempts to preempt a channel at an interval of one period. If preemption succeeds, the base station configures a PRACH resource, and the PRACH resource is used by the UE to send an SI preamble sequence. If preemption succeeds, the UE sends the SI preamble sequence by using a PRACH resource in the period. For an aperiodical PRACH, the UE may blindly detect a PDCCH, to determine whether the base station configures a PRACH resource in a subsequent subframe.

For example, if the base station preempts, by configuring a period, the cell frequency resource to send the system message, the base station may determine the PRACH resource by using Table 1.

| Common SI configuration index Common SI Configuration Index $I_{SIR}$ | SIR periodicity SIR Periodicity (ms) | SIR subframe offset SIR Subframe Offset $N_{offset,\,SIR}$ |
| --- | --- | --- |
| 0-4 | 5 | $I_{SIR}$ |
| 5-14 | 10 | $I_{SIR} - 5$ |
| 15-34 | 20 | $I_{SIR} - 15$ |
| 35-74 | 40 | $I_{SIR} - 35$ |
| 75-154 | 80 | $I_{SIR} - 75$ |
| 155-156 | 2 | $I_{SIR} - 155$ |
| 157 | 1 | $I_{SIR} - 157$ |

$I_{SIR}$ represents a configuration index of the SI request resource, the SIR periodicity represents a periodicity of the SI request resource, and the SIR subframe offset represents a subframe offset of the SI request resource relative to the PRACH resource. For example, if the eNB configures that a value of $I_{SIR}$ of the user equipment is 8, the user equipment obtains, by searching the table, that a value of the SIR periodicity is 10 ms, and a value of $N_{offset,SIR}$ is ISIR-5=3, indicating that the subframe offset is 3.

Figure 5:
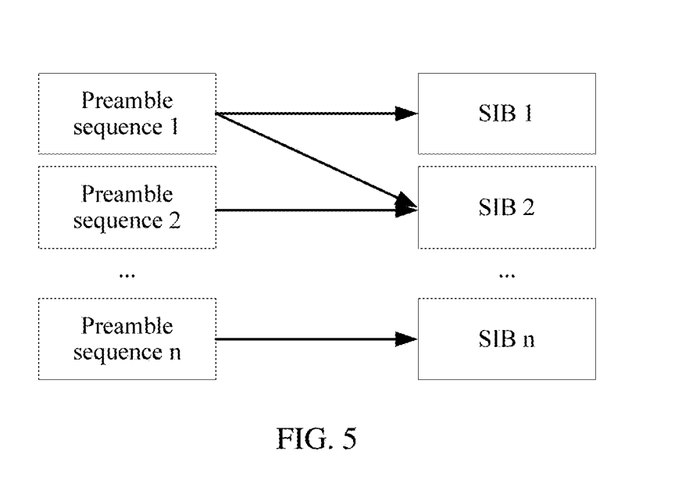
FIG. 5 is a diagram of a mapping relationship between a preamble sequence and a SIB according to an embodiment of the present invention.

In addition, it should be understood that the time domain location and the frequency domain location of the request resource configured by the base station may be agreed on in a same manner or in different manners. For example, the time domain location of the request resource configured by the base station is specified in a communication protocol, and the frequency domain location of the request resource configured by the base station is notified by the base station to the UE using a MIB.

sent, and the like. The mapping relationship between a preamble sequence and a SIB may be specified in a protocol, or may be configured by the base station and then notified to the UE using a MIB or a SIB1-x.

205. The base station sends a configuration parameter of the request resource to the UE.

After configuring the SI request resource, the base station may send the configuration parameter of the SI request resource to the UE.

Optionally, the base station may send the configuration parameter to the UE by using a MIB or a SIB1-x.

For example, the configuration parameter of the SI request resource may be specifically shown in the following data structure:

```
RACH-Config ::=                    SEQUENCE {
    PRACH-ConfigSIB ::=                SEQUENCE {
        rootSequenceIndex                  INTEGER (0..837),
        prach-ConfigInfo                   PRACH-ConfigInfo
}
    PRACH-ConfigInfo ::=               SEQUENCE {
        highSpeedFlag                      BOOLEAN,
        zeroCorrelationZoneConfig          INTEGER (0..15),
}
    RACH-ConfigCommon ::=              SEQUENCE {
        preambleInfo                       SEQUENCE {
            numberOfRA-Preambles               ENUMERATED {
                                                   n1, n4, n8, n12, n16, n20,
n24, n28,
                                                   n32, n36, n40, n44, n48,
n52, n56,
                                                   n60, n64},
        },
        powerRampingParameters
    PowerRampingParameters,
    }
        PowerRampingParameters ::=     SEQUENCE {
            powerRampingStep               ENUMERATED {dB0, dB2,dB4,
dB6}  OPTIONAL,
            preambleInitialReceivedTargetPower    ENUMERATED {
                                                   dBm-120, dBm-118, dBm-116, dBm-
114, dBm-112,                                      dBm-110, dBm-108, dBm-106, dBm-
104, dBm-102,                                      dBm-100, dBm-98, dBm-96,
dBm-94,
                                                   dBm-92, dBm-90}
    }
        PreambleTransMax ::=               ENUMERATED {
                                                   n3, n4, n5, n6, n7, n8, n10,
n20, n50,                                          n100, n200}    OPTIONAL,
}
```

Optionally, the base station may allocate one or more preamble sequences for requesting SI by the UE. The UE may request the SI by sending the preamble sequence.

When configuring the preamble sequence, the base station may further configure a correspondence between a preamble sequence and a SIB. One preamble sequence is corresponding to one or more types of SIBs. When receiving a preamble sequence sent by the UE, the base station may learn that one or more types of SIBs corresponding to the preamble sequence need to be sent. FIG. 5 is a diagram of a mapping relationship between a preamble sequence and a SIB according to an embodiment of the present invention. As shown in FIG. 5, the base station may configure that an SI preamble sequence 1 corresponds to a SIB 1 and a SIB 2, a preamble sequence 2 corresponds to the SIB 2, . . . , a preamble sequence n corresponds to a SIB n, and the like. When receiving the preamble sequence 1 sent by the UE, the base station may learn that the SIB 1 and the SIB 2 need to be sent, when receiving the preamble sequence 2 sent by the UE, the base station may learn that the SIB 2 needs to be where rootSequenceIndex represents a root sequence of an SI preamble sequence, highSpeedFlag represents whether the UE moves at a high speed, zeroCorrelationZoneConfig represents a cyclic shift length of the root sequence, numberOfRA-Preambles indicates a quantity of preamble sequences in a cell, powerRampingStep represents a transmit power ramping step of the SI preamble sequence, preambleInitialReceivedTargetPower represents a preamble power that the base station expects to receive, and a PreambleTransMax represents a maximum quantity of preamble sequence retransmission times.

Similar to a random access (RA) message 1 in an existing protocol, the SI preamble sequence is generated through cyclic shift of the root sequence. The UE may randomly select a preamble sequence, and then send the preamble sequence on the PRACH resource configured by the base station. If the sending fails, the UE increases a transmit power by adding one power step (powerRampingStep), and performs a random access process again, until the maximum quantity of preamble sequence retransmission times (PreambleTransMax) is reached.

206. The user equipment sends an SI request to the base station.

The user equipment may send the SI preamble sequence on a request resource pre-allocated in the first-type cell. It should be understood that all users in the unlicensed spectrum cell can request SI using the pre-allocated request resource. It should be understood that, for a manner in which the user equipment obtains a time-frequency location, the configuration parameter, and the like of the SI request resource, refer to steps 204 and 205.

Optionally, if a correspondence exists between a preamble sequence resource configured by the base station for the UE and a type of a SIB that needs to be sent, the user equipment may determine a corresponding preamble sequence based on a SIB that needs to be requested, and send the preamble sequence.

207. The base station sends SI based on the SI request.

The base station may receive, on the request resource pre-allocated in the first-type cell, the preamble sequence sent by the UE.

Optionally, the base station may send, to the UE according to the correspondence between a preamble sequence and a SIB type, a SIB of a type corresponding to the received preamble sequence.

It should be understood that the base station may send, to the UE in one or more SI windows following a current SI window of the first-type cell, SIBs corresponding to all preamble sequences received in the current SI window. Preferably, the base station may send these SIBs to the UE in an $N^{th}$ SI window following the current SI window.

A mapping relationship diagram in FIG. 5 is used as an example. If the base station receives the preamble sequence 1 and the preamble sequence n in an SI window 1 of the first-type cell, the base station may send SI including the SIB 1, the SIB 2, and the SIB n. Certainly, it should be understood that one UE or different UEs may send an SI request using the preamble sequence 1 and the preamble sequence n. In addition, the base station may send the SIB 1, the SIB 2, and the SIB n in one or more SI windows following the SI window 1, and the like.

Optionally, the base station may directionally send the SI to corresponding UE through unicast.

Optionally, the base station may send the SI to all UEs in the cell through broadcast.

In addition, to avoid a case in which the UE does not receive the SI, the base station may repeatedly send the SI.

208. The UE receives the requested SI.

The UE receives, in the unlicensed spectrum cell, the SI sent by the base station.

It should be understood that, in this embodiment of the present invention, the PRACH resource may be replaced with a PUCCH resource. The base station may select some or all of the PUCCH resource as the resource for sending an SI request. The UE may send an SI request using a PUCCH format 1a, 1b, 1, 3, and the like (certainly, the SI request may be sent in another manner). In this case, the UE may add, to the SI request, SI that needs to be requested. Correspondingly, the base station obtains, using the SI request, the SI that the UE needs to request.

When the base station uses the PUCCH resource as the resource for sending an SI request, a related configuration parameter required for sending the SI request needs to be changed accordingly. For example, the configuration parameter of the SI request resource may be specifically shown in the following data structure:

```
PUCCH-CommonSI-Config ::=   SEQUENCE {
    sir-PUCCH-ResourceIndex   INTEGER (0..2047),
        p0-NominalPUCCH        INTEGER (-127..-96),
    deltaFList-PUCCH          DeltaFList-PUCCH,
}
DeltaFList-PUCCH ::=         SEQUENCE {
    deltaF-PUCCH-Format1      ENUMERATED {deltaF-2,
deltaF0, deltaF2},
    deltaF-PUCCH-Format1b     ENUMERATED {deltaF1,
deltaF3, deltaF5},
    deltaF-PUCCH-Format3      ENUMERATED {deltaF-2,
deltaF0, deltaF1, deltaF2},
}
``` where sir-PUCCH-ResourceIndex indicates a location of the PUCCH resource, po-NominalPUCCH represents a power that is of the PUCCH format 1a and that the base station expects to receive, and deltaFList-PUCCH indicates a power offset of another format of PUCCH relative to the PUCCH format 1a when the another format of PUCCH is used.

Implementation of other steps is similar to the foregoing steps in FIG. 2. Details are not described.

Figure 6:
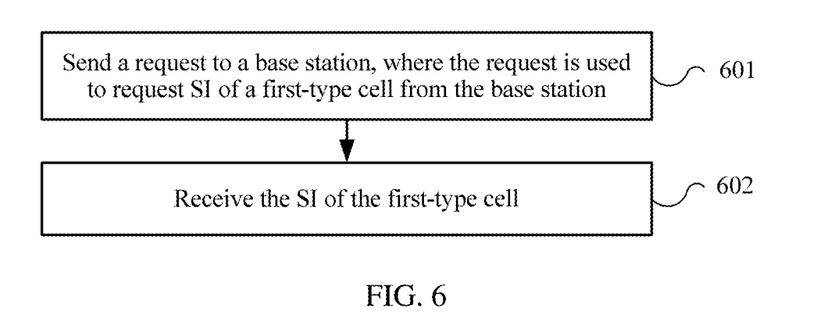
FIG. 6 is a flowchart of a system information transmission method according to an embodiment of the present invention.

FIG. 6 is a flowchart of a system information transmission method according to an embodiment of the present invention. The method in FIG. 6 is executed by UE.

601. Send a request to a base station, where the request is used to request at least one type of SI of a first-type cell from the base station.

The first-type cell is a serving cell on which channel detection needs to be performed before data is sent.

602. Receive the at least one type of SI of the first-type cell.

In this embodiment of the present invention, the UE requests the system message from the base station based on a requirement, so that unnecessary SI overheads can be reduced, and interference caused by the base station to another cell can be reduced.

In addition, in the method in this embodiment of the present invention, when it cannot be ensured that cell system information is periodically broadcast, the base station can send the SI to the cell of the user equipment in a timely manner based on the request of the user equipment.

Optionally, in an embodiment, step 602 is specifically: receiving the at least one type of SI of the first-type cell in one or more SI windows following a current SI window that is corresponding to the first-type cell at a current moment at which the request is sent to the base station. Preferably, the SI window for receiving the at least one type of SI of the first-type cell is an $N^{th}$ SI window following the current SI window, and N is an integer greater than or equal to 1.

Optionally, an SI window time length of the first-type cell is less than or equal to an SI window period of the first-type cell. It should be understood that one cell has only one SI window at one moment.

Optionally, the SI requested by the request is sent through broadcast, or the SI requested by the request is sent through unicast.

Optionally, step 601 may be specifically: sending the request on a request resource pre-allocated in the first-type cell. When time-frequency resource location information of the pre-allocated request resource is agreed on in advance in a communication protocol or is obtained by using a broadcast message, all user equipments in the first-type cell can request SI by using the pre-allocated request resource; or when time-frequency resource location information of the pre-allocated request resource is obtained through unicast or by using dedicated signaling, user equipment that obtains the time-frequency resource location information of the pre-allocated request resource can request SI by using the pre-allocated request resource.

Optionally, in an embodiment, a time domain location of a time-frequency resource on which the request resource is located is agreed on in advance in a communication protocol.

Optionally, in another embodiment, a time domain location of a time-frequency resource on which the request resource is located is obtained by receiving a MIB message.

Optionally, in still another embodiment, a time domain location of a time-frequency resource on which the request resource is located is obtained by receiving a SIB1-x message, where the SIB1-x message is a periodically broadcast message in a SIB1 message of the first-type cell.

Optionally, in an embodiment, a frequency domain location of the time-frequency resource on which the request resource is located is agreed on in advance in a communication protocol.

Optionally, in another embodiment, a frequency domain location of the time-frequency resource on which the request resource is located is obtained by receiving a MIB message.

Optionally, in still another embodiment, a frequency domain location of the time-frequency resource on which the request resource is located is obtained by receiving a SIB1-x message, where the SIB1-x message is a periodically broadcast message in a SIB1 message of the first-type cell.

Optionally, in yet another embodiment, a frequency domain location of the time-frequency resource on which the request resource is located is obtained by detecting a physical downlink control channel PDCCH resource.

It should be understood that, before sending the request, the user equipment needs to learn of a configuration parameter for sending the request. The configuration parameter for sending the request includes a parameter required for generating the request, such as a root and a cyclic shift interval.

Optionally, in an embodiment, the configuration parameter for sending the SI request is agreed on in advance in a communication protocol, or is generated based on a parameter such as a cell identity.

Optionally, in another embodiment, the configuration parameter for sending the SI request is obtained by receiving a MIB message.

Optionally, in still another embodiment, the configuration parameter for sending the SI request is obtained by receiving a SIB1-x message, where the SIB1-x message is a periodically broadcast message in a SIB1 message of the base station.

Optionally, the request resource may be a PRACH resource or a PUCCH resource.

Optionally, before step 601, the method may further include: receiving, in the first-type cell, indication information sent by the base station, where the indication information indicates that the base station has obtained a frequency resource of the first-type cell.

For specific implementation of this embodiment of the present invention, refer to the method executed by the UE in the embodiment shown in FIG. 2 and the extended embodiment thereof. Details are not described again in this embodiment of the present invention.

This application further provides a base station 1, configured to execute the method in the embodiment shown in FIG. 1, and implement a function of the base station in the embodiment shown in FIG. 2 and the extended embodiment thereof.

Specifically, the base station 1 may implement a corresponding method using a function module. The base station 1 may include units configured to execute the method in the embodiment shown in FIG. 1.

This application further provides user equipment 1, configured to execute the method in the embodiment shown in FIG. 1, and implement a function of the UE in the embodiment shown in FIG. 2 and the extended embodiment thereof.

Specifically, the user equipment 1 may implement a corresponding method using a function module. The user equipment 1 may include units configured to execute the method in the embodiment shown in FIG. 1.

An embodiment of the present invention further provides a base station 2. A schematic diagram of a physical apparatus structure of the station 2 may be shown in FIG. 7, including a processor 702, a memory 703, a transmitter 701, and a receiver 704.

The receiver 704, the transmitter 701, the processor 702, and the memory 703 are connected to each other using a bus system 705. The bus 705 may be an ISA bus, a PCI bus, an EISA bus, or the like. The bus may be classified into an address bus, a data bus, a control bus, and the like. For ease of representation, the bus is indicated by using only one double-headed arrow in FIG. 7. However, it does not mean that there is only one bus or only one type of bus.

Figure 7:
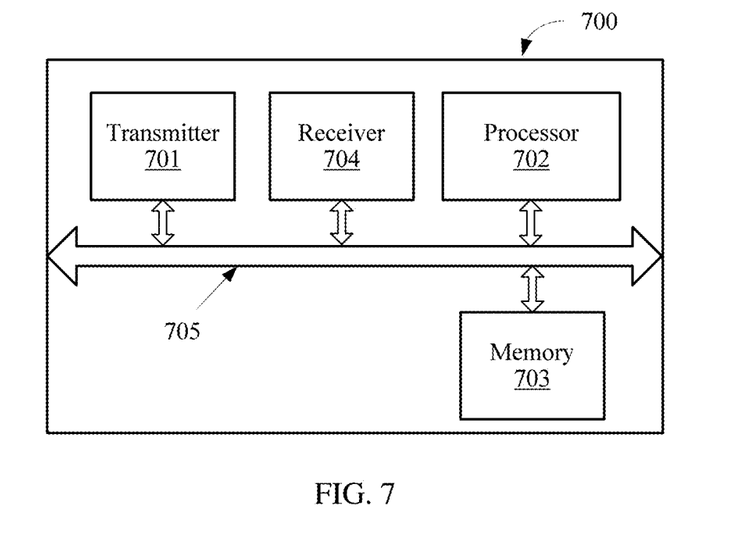
FIG. 7 is a schematic structural diagram of a physical apparatus according to an embodiment of the present invention.

The memory 703 is configured to store a program. Specifically, the program may include program code, and the program code includes a computer operation instruction. The memory 703 may include a read-only memory and a random access memory, and provide an instruction and data for the processor 702. The memory 703 may include a high-speed RAM memory, and may further include a non-volatile memory, for example, at least one disk memory.

The processor 702 is configured to execute the program stored in the memory 703.

Specifically, in the base station 2, the processor 702 may be configured to execute the method in the embodiment shown in FIG. 1, and implement a function of the base station in the embodiment shown in FIG. 2 and the extended embodiment thereof.

The processor 702 may be an integrated circuit chip, and have a signal processing capability. In an implementation process, the steps in the foregoing methods may be completed by using an integrated logic circuit of hardware in the processor 702 or an instruction in a form of software. The processor 702 may be a general purpose processor, including a central processing unit (CPU), a network processor (NP), and the like; or may be a digital signal processor (DSP), an application-specific integrated circuit (ASIC), a field programmable gate array (FPGA) or another programmable logic device, a discrete gate or a transistor logic device, or a discrete hardware component. The processor 702 may implement or perform the methods, the steps, and logical block diagrams that are disclosed in the embodiments of the present invention. The general purpose processor may be a microprocessor, or the processor may be any conventional processor, or the like. The steps of the methods disclosed with reference to the embodiments of the present invention may be directly performed and implemented by a hardware decoding processor, or may be performed and implemented using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 703. The processor 702 reads information in the memory 703, and completes the steps of the foregoing methods in combination with hardware of the processor 702.

An embodiment of the present invention further provides user equipment 2. A schematic diagram of a physical apparatus structure of the user equipment 2 may be shown in FIG. 7. The user equipment 2 includes a physical unit similar to that in the base station 2. Details are not described again.

Specifically, in the user equipment 2, a processor 702 may be configured to execute the method in the embodiment shown in FIG. 6, and implement a function of the UE in the embodiment shown in FIG. 2 and the extended embodiment thereof.

An embodiment of the present invention further provides a computer readable storage medium 1, where the computer readable storage medium stores one or more programs, and the one or more programs include an instruction. When the instruction is executed by a portable electronic device that includes a plurality of application programs, the portable electronic device can execute the method in the embodiment shown in FIG. 1.

An embodiment of the present invention further provides a computer readable storage medium 2, where the computer readable storage medium stores one or more programs, and the one or more programs include an instruction. When the instruction is executed by a portable electronic device that includes a plurality of application programs, the portable electronic device can execute the method in the embodiment shown in FIG. 6.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, from a user equipment, a request message on a request resource pre-allocated in a first-type cell,
      the request message requesting a first type of system information (SI) of the first-type cell,
      the first-type cell being a serving cell on which channel detection needs to be performed before data is sent, and
      the request message being in response to time-frequency resource location information of the pre-allocated request resource being preset in advance in a communication protocol, sent using a broadcast message, sent through unicast, or sent using dedicated signaling; and
   sending, based on the request message, the first type of SI of the first-type cell to the user equipment.

2. The method according to claim 1, wherein sending the first type of SI of the first-type cell to the user equipment comprises:
   sending, based on the request message, the first type of SI of the first-type cell to the user equipment in one or more SI windows following a current SI window, the current SI window corresponding to the first-type cell at a current moment, and the user equipment sending the request message in the current moment.

3. The method according to claim 2, wherein a first SI window of the one or more SI windows is an Nth SI window following the current SI window, and N is an integer greater than or equal to 1.

4. The method according to claim 3, wherein:
- a time domain location of a time-frequency resource on which the request message is received is set in advance in the communication protocol; and
  - the time domain location of the time-frequency resource on which the request message is received is sent to the user equipment using a MIB message; or
  - the time domain location of the time-frequency resource on which the request message is received is sent to the user equipment using a SIB1-x message, wherein the SIB1-x message is periodically broadcast information in a SIB1 message of the first-type cell.

5. The method according to claim 2, wherein:
- when the time-frequency resource location information of the pre-allocated request resource is preset in advance in the communication protocol, or when the time-frequency resource location information of the pre-allocated request resource is sent using the broadcast message, all user equipments, in the first-type cell, request respective SI using the pre-allocated request resource; or
- when the time-frequency resource location information of the pre-allocated request resource is sent through unicast, or using dedicated signaling, all user equipments, that obtain the time-frequency resource location information of the pre-allocated request resource, request the respective SI using the pre-allocated request resource.

6. A user equipment, comprising:
- a transmitter, configured to send, on a request resource pre-allocated in a first-type cell, a request message to a base station,
  - wherein the request message requests a first type of SI of the first-type cell from the base station,
  - wherein the first-type cell is a serving cell on which channel detection needs to be performed before data is sent, and
  - wherein the request message is sent in response to time-frequency resource location information of the pre-allocated request resource being preset in advance in a communication protocol, sent using a broadcast message, sent through unicast, or sent using dedicated signaling; and
- a receiver, configured to receive the first type of SI of the first-type cell.

7. The user equipment according to claim 6, wherein the receiver being configured to configured to receive the first type of SI of the first-type cell comprises the receiver being configured to:
- receive the first type of SI of the first-type cell in one or more SI windows following a current SI window, wherein the current SI window corresponds to the first-type cell at a current moment, and wherein the user equipment sends the request message to the base station in in the current moment.

8. The user equipment according to claim 7, wherein a first SI window of the one or more SI windows is an Nth SI window following the current SI window, and N is an integer greater than or equal to 1.

9. The user equipment according to claim 6, wherein:
- when the time-frequency resource location information of the pre-allocated request resource is set in advance in the communication protocol, or is obtained using the broadcast message, all user equipments, in the first-type cell, request respective SI using the pre-allocated request resource; or
- when the time-frequency resource location information of the pre-allocated request resource is obtained through unicast, or using dedicated signaling, all user equipments, that obtain the time-frequency resource location information of the pre-allocated request resource, request the respective SI using the pre-allocated request resource.

10. The user equipment according to claim 9, wherein:
- a time domain location of a time-frequency resource on which the pre-allocated request resource is located is set in advance in the communication protocol; and
  - the time domain location of the time-frequency resource on which the pre-allocated request resource is located is obtained by receiving a MIB message; or
  - the time domain location of the time-frequency resource on which the pre-allocated request resource is located is obtained by receiving a SIB1-x message, wherein the SIB1-x message is a periodically broadcast message in a SIB1 message of the first-type cell.

11. A base station, comprising:
- a receiver, configured to receive, on a request resource pre-allocated in a first-type cell, a request message sent by user equipment,
  - wherein the request message requests a first type of SI of the first-type cell,
  - wherein the first-type cell is a serving cell on which channel detection needs to be performed before data is sent, and
  - wherein the request message is in response to time-frequency resource location information of the pre-allocated request resource being preset in advance in a communication protocol, sent using a broadcast message, sent through unicast, or sent using dedicated signaling; and
- a transmitter, configured to send, based on the request message, the first type of SI of the first-type cell to the user equipment.

12. The base station according to claim 11, wherein the transmitter being configured to configured to send, based on the request message, the first type of SI of the first-type cell to the user equipment comprises the transmitter being configured to send, based on the request message, the first type of SI of the first-type cell to the user equipment in one or more SI windows following a current SI window, wherein the current SI window corresponds to the first-type cell at a current moment, and the user equipment sends the request message in the current moment.

13. The base station according to claim 12, wherein a first SI window of the one or more SI windows is an Nth SI window following the current SI window, and N is an integer greater than or equal to 1.

14. The base station according to claim 13, wherein:
- a time domain location of a time-frequency resource on which the request message is received is set in advance in the communication protocol; and
  - the time domain location of the time-frequency resource on which the request message is received is sent by the base station to the user equipment using a MIB message; or
  - the time domain location of the time-frequency resource on which the request message is received is sent by the base station to the user equipment by using a SIB1-x message, wherein the SIB1-x message is periodically broadcast information in a SIB1 message of the first-type cell.

15. The base station according to claim 11, wherein:

when the time-frequency resource location information of the pre-allocated request resource is set in advance in the communication protocol, or is sent using the broadcast message, all user equipments, in the first-type cell, request respective SI using the pre-allocated request resource; or when the time-frequency resource location information of the pre-allocated request resource is sent through unicast, or using dedicated signaling, all user equipments, that obtain the time-frequency resource location information of the pre-allocated request resource, request the respective SI using the pre-allocated request resource.

* * * * *